(12) United States Patent
Boulkenafed et al.

(10) Patent No.: US 10,347,040 B2
(45) Date of Patent: Jul. 9, 2019

(54) HYBRID STREAMING

(71) Applicant: DASSAULT SYSTEMES, Velizy Villacoublay (FR)

(72) Inventors: Malika Boulkenafed, Courbevoie (FR); Jean Julien Tuffreau, Montreal (CA)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 15/387,189

(22) Filed: Dec. 21, 2016

(65) Prior Publication Data
US 2017/0178400 A1 Jun. 22, 2017

(30) Foreign Application Priority Data
Dec. 22, 2015 (EP) .................................. 15307116

(51) Int. Cl.
| G06T 17/00 | (2006.01) |
| G06K 9/62  | (2006.01) |
| G06T 1/60  | (2006.01) |
| G06T 15/50 | (2011.01) |
| G06T 19/20 | (2011.01) |
| H04N 19/426 | (2014.01) |

(52) U.S. Cl.
CPC ............ *G06T 17/00* (2013.01); *G06K 9/6201* (2013.01); *G06T 1/60* (2013.01); *G06T 15/50* (2013.01); *G06T 19/20* (2013.01); *H04N 19/426* (2014.11); *G06T 2200/16* (2013.01)

(58) Field of Classification Search
None
See application file for complete search history.

(56) References Cited

U.S. PATENT DOCUMENTS

| 6,377,257 | B1  | 4/2002 | Borrel et al. |
| 2005/0131657 | A1 | 6/2005 | Sean Mei et al. |
| 2007/0211065 | A1* | 9/2007 | Feth ........................ G06T 19/00 345/522 |
| 2008/0143720 | A1* | 6/2008 | Elmquist ................. G06T 15/50 345/426 |
| 2009/0073164 | A1* | 3/2009 | Wells ....................... G06T 11/00 345/419 |
| 2011/0225523 | A1* | 9/2011 | Newton ............. H04N 13/0018 715/762 |
| 2015/0154051 | A1* | 6/2015 | Kruglick ................... G06F 9/50 345/522 |

OTHER PUBLICATIONS

Sugano, Natsuki, Hirokazu Kato, and Keihachiro Tachibana. "The effects of shadow representation of virtual objects in augmented reality." Mixed and Augmented Reality, 2003. Proceedings. The Second IEEE and ACM International Symposium on. IEEE, 2003.*

(Continued)

*Primary Examiner* — Ryan M Gray
(74) *Attorney, Agent, or Firm* — Oblon, McClelland, Maier & Neustadt, L.L.P.

(57) ABSTRACT

The invention notably relates to a computer-implemented method for displaying a 3D assembly of modeled objects. The method comprises streaming from a first computer to a second computer at least one raster image of a first 3D modeled object, and rendering on the second computer the 3D assembly of modeled objects by merging a second 3D modeled object with the streamed at least one raster image.

13 Claims, 6 Drawing Sheets

(56) References Cited

OTHER PUBLICATIONS

Extended European Search Report dated Oct. 21, 2016 in Patent Application No. 15307116.2.
Tom Jehaes, et al., "Hybrid representations to improve both streaming and rendering of dynamic networked virtual environments", Virtual Reality Continuum and Its Applications, Proceedings of the 2004 ACM SIGGRAPH international conference on Virtual Reality continuum and its applications in industry, XP055275740, 2004, 8 Pages.
Eduardo Hidalgo, et al., "Hybrid Geometric—Image Based Rendering", EUROGRAPHICS 2002, XP055275775, vol. 21, No. 3, 2002, pp. 471-482.
Denis Kalkofen, et al., "Interactive Focus and Context Visualization for Augmented Reality", Mixed and Augmented Reality, IEEE, XP031269895, 2007, 10 Pages.
N. Menzel, et al., "g-BRDFs: An Intuitive and Editable BTF Representation", Computer Graphics forum, XP055308433, vol. 28, No. 8, 2009, pp. 2189-2200.
J. Whyte, et al., "From CAD to virtual reality: modelling approaches, data exchange and interactive 3D building design tools", Automation in Construction, XP002523022, vol. 10, 2000, pp. 43-55.
László Szirmay-Kalos, et al., "Displacement Mapping on the GPU—State of the Art", Budapest University of Technology, Hungary, XP002637303, vol. 25, No. 3, 2006, 24 Pages.
Elmar Eisemann, et al., "Efficient Real-Time Shadows", SIGGRAPH 2012 Course Notes, XP058008352, 2012, 44 Pages.

* cited by examiner

HYBRID STREAMING

CROSS-REFERENCE TO RELATED APPLICATIONS

This application claims priority under 35 U.S.C. § 119 or 365 to European Application No. 15307116.2, filed Dec. 22, 2015. The entire contents of the above application(s) are incorporated herein by reference.

FIELD OF THE INVENTION

The invention relates to the field of computer programs and systems, and more specifically to a method, system and program for displaying a 3D assembly of modeled objects.

BACKGROUND

In the contexts of computer-aided design (CAD), computer-aided engineering (CAE), computer-Aided. Manufacturing (CAM), virtual worlds, online video games, and more generally in the context of 3D online applications, the display of a three-dimensional (3D) environment (also referred to as 3D scene) and its content—various assets that describe a partial or complete 3D virtual environment—is still a challenge. The 3D scene comprise 3D models, wherein each 3D model is an asset and has a usual representation including polygonal meshes, spline surfaces, constructive solid geometries . . . . Materials and textures can be also assets of the 3D scene, as well as animations of the 3D models, lights, scene graphs. The computer hosting the assets is referred to as a content server. A rendered image of this 3D scene viewed from a particular viewpoint (also referred to as virtual camera) can be displayed on a second computer. This process of remote rendering is typically used for cloud gaming, virtual globes, virtual world. The second computer on which this remote rendering is carried out is referred to as a client.

A 3D online application includes a software component called 3D rendering engine to produce one or more pictures of the 3D scene viewed from a particular viewpoint by taking into account 3D projections and several lighting effects (shadows, reflections, etc.). To achieve its goal, such 3D online application must transfer information of the 3D scene from the server(s) to the client(s) at given times.

There are basically two scenarios for performing the remote rendering of the 3D scene. The first one consists in directly sending 3D content from a server to a client and this client performs the rendering step. This will be referred as geometry streaming. This method usually describes how virtual worlds work. The second scenario comprises a server that performs the rendering step and sends the result (static image or video streams) to a client. This will be referred as pixel streaming. This method usually describes how remote rendering and cloud gaming work.

Geometry streaming can use many strategies to transmit the content of a 3D scene. An example of strategy is the concept of level of detail: for each asset a minimum quality level, that does not disturb the overall quality of the final rendering, is deduced from the visibility computation. If the version of an asset in the client cache does not reach the required quality level, the server sends refinements (usually the differences between the required version and the version in the client cache. Examples of involved technologies in such strategy are progressive meshes, terrain displacement mapping, voxel based point cloud, hierarchical levels of detail.

In the case of pixel streaming transferred data are pictures or videos usually compressed with standard compression schemes (JPEG/JPEG2000 for images and H.264 for videos). Some variants exist to distribute the computation across multiple computers. In 3D computer graphics it refers to the 2D rectangle used to project the 3D scene to the position of a virtual camera. A viewport is a region of the screen used to display a portion of the total image to be shown. The application can cut the viewport and assign the responsibility of rendering each section (smaller frames) to several computers. In another variant, the application can cut the 3D scene and assign the responsibility of rendering each section (smaller sets of assets) to several computers.

Geometry streaming and pixel streaming handle differently the issues encountered with 3D online applications. They have their own disadvantages and their own limit as explained now.

Geometry streaming and pixel streaming differently scale with an increasing number of clients. Pixel streaming is heavily penalized, since a big part of the computation (including the rendering) is made on the server side. Thus, the number of required servers quickly grows with the number of clients. It is hard to find computation results that can be reused from one client to another since they rarely share the same point of view. Geometry streaming scales better since it requires less computation on the server side. However, sending over a computer network geometries consumes bandwidth of the network and generally involves lags—less reactivity for the application—on the 3D scene rendered on the client computer.

Geometry streaming and pixel streaming involve client hardware requirements. As mentioned above, pixel streaming has only a small computation cost on the client side, while geometry streaming requires some 3D display capabilities on the client side. Although most of light devices now benefit from hardware acceleration for 3D display, their capabilities may be relatively limited, which may lead to less realistic pictures or less reactivity for the application.

Both geometry streaming and pixel streaming have a significant bandwidth consumption and require network reliability. Many efficient rate-distortion algorithms can be used with pixel streaming to ensure a fair consumption of the bandwidth. However streaming videos is usually quite expensive compared to other applications. If the available bandwidth is suddenly lowered, the quality of the transmitted images can be reduced accordingly. In case of network interruption, the client will not be able to change its viewpoint or to interact with the 3D scene. As introduced previously, geometry streaming is more likely to experience spikes in the bandwidth usage, leading to bandwidth saturation and network errors. An additional effort must be done on the design of the application (use of levels of detail or LODs) and on the design of the 3D scene (the amount of information in different regions of the scene graph must be balanced) to mitigate this effect. If the available bandwidth is suddenly lowered, bandwidth saturation will occur more, often leading to missing/deteriorated parts of the scene in the client view. In case of network interruption, the client is still able to change its viewpoint and to interact with the elements of the scene that were already transmitted.

Within this context, there is still a need for an improved method for performing a rendering of a 3D scene on a client connected to a server.

SUMMARY OF THE INVENTION

It is therefore provided a computer-implemented method for displaying a 3D assembly of modeled objects. The method comprises streaming from a first computer to a second computer at least one raster image of a first 3D modeled object; and rendering, on the second computer, the 3D assembly of modeled objects by merging a second 3D modeled object with the streamed at least one raster image.

The method may comprise one or more of the following:
- streaming from a first computer to a second computer comprises simultaneously streaming from a first computer to a second computer at least one raster image of a first 3D modeled object together with a first depth buffer of the said at least one raster image; and wherein merging a second 3D modeled object with the streamed at least one raster image further comprises performing a pixel-by-pixel comparison to determine which fragments of the second 3D modeled object is rendered;
- before the streaming: encoding both the at least one raster image of the first 3D modeled object and the first depth buffer in a single stream;
- the encoding is performed by using a video compression scheme;
- after merging: computing, by the second computer, lighting effects on the 3D assembly of modeled objects;
- computing lighting effects on the 3D assembly of modeled objects comprises: receiving, on the second computer, first light sources associated with the at least one raster image of the first 3D modeled object and second light sources associated with the second 3D modeled object; computing lighting effects as post processing starting from surface normal direction and material property of each pixel;
- after receiving the first and second light sources and before computing the lighting effects: computing a normal map that stores, for each pixel of the 3D assembly of modeled objects, a surface normal direction; computing an identification buffer that identifies, for each pixel of the 3D assembly of modeled objects, whether a pixel comes from the streamed at least one raster image of the first 3D modeled object or from the second 3D modeled object merged with the streamed at least one raster image;
- the normal map is computed from a second depth buffer obtained by merging the second 3D modeled object with a first depth buffer of the said at least one raster image;
- computing the normal map from the second depth buffer comprises applying a convolution filter to the second depth buffer;
- the material property of each pixel is inferred from the color of each pixel of the merged second 3D modeled object with at least one raster image;
- sending from the second computer to the first computer coordinates of a new viewpoint on the 3D assembly of modeled objects rendered on the second computer; computing at least one new raster image of the first 3D modeled object according to the new viewpoint; and streaming from the first computer to the second computer the at least one new raster image of the first 3D modeled object;
- the second 3D modeled merged with the streamed at least one raster image is sent from a third computer to the second computer.

It is further provided a computer program comprising instructions for performing the method.

It is further provided a computer readable storage medium having recorded thereon the computer program.

It is further provided a system comprising a first computer and a second computer that are connected with a streaming channel, the first and second computers comprising a processing circuitry coupled to a memory, and the second computer further comprising a graphical user interface, each memory of the first and second computer having recorded thereon a computer program for performing the method.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
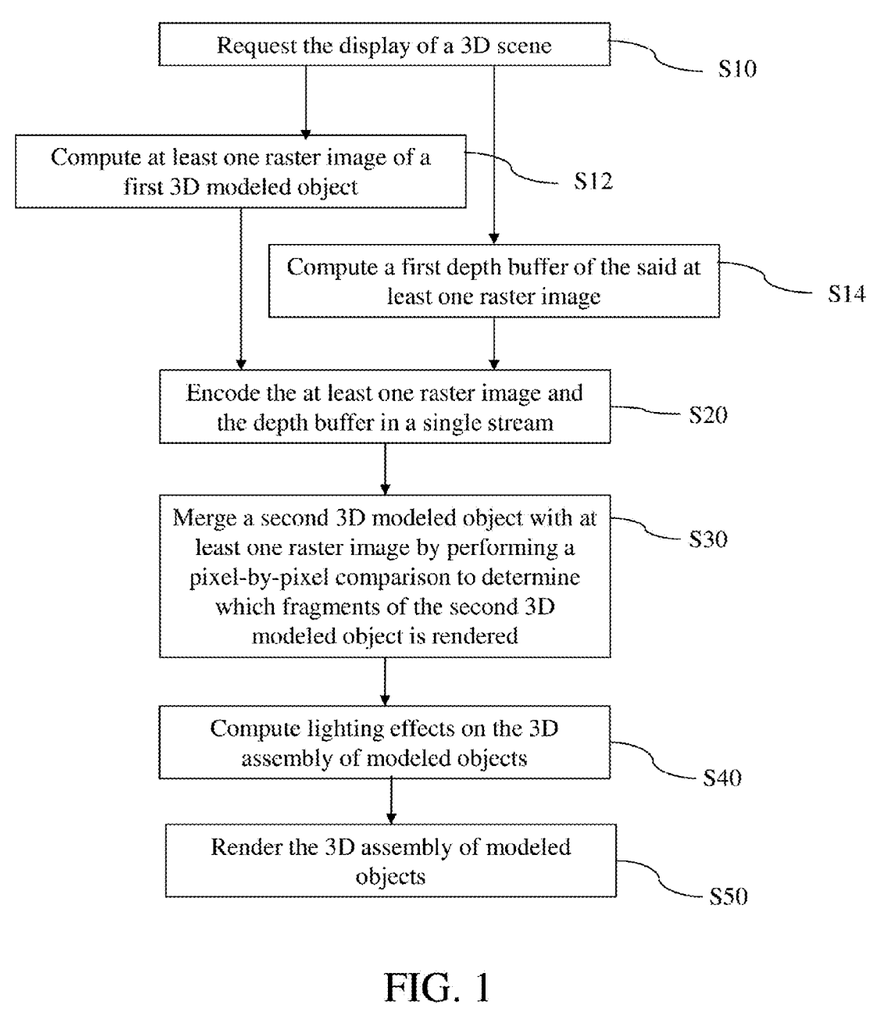
FIG. 1 shows a flowchart of an example of the method.

With reference to the flowchart of FIG. 1, it is proposed a computer-implemented method for displaying a 3D assembly of modeled objects, e.g. the content of the 3D assembly of modeled objects is stored on one or more servers and remotely rendered to at least one computer client. The method comprises streaming from a first computer (also referred to as a server) to a second computer (also referred to as a client) at least one raster image of a first 3D modeled object. The method further comprises rendering, on the second computer, the 3D assembly of modeled objects by merging a second 3D modeled object with the streamed at least one raster image.

Such a method improves the remote display on a client of a 3D scene with several assets forming the scene stored on a server distant to the client, e.g. the server and the client are interconnected through a computer network that can be, but is not limited to, a Local Area Network (LAN), Metropolitan Area Network (MAN), Wide Area Network (WAN), s set of interconnected networks such as the Internet, . . . .

Notably, the method of the present invention relies on a partitioning of the 3D scene in two parts: a part will be transmitted with pixel streaming and the other part with geometry streaming. How this partition is made (between what will be streamed as video and what will be streamed as geometry) is at the discretion of the application in order to leverage the best of each method depending on its needs. Thus, the present method brings a balanced payload between the client and the server. As geometry streaming relies more on the client and pixel streaming more on the server, the present method finds its place in the middle, which is more efficient. If the constraints in the design of the application allow to move some assets (e.g. 3D modeled objects, materials, textures, animations of the 3D models, lights, scene graphs, . . . ) from the part streamed as pixel to the part streamed as geometries and vice versa, then the application will be able to balance dynamically the payload between the client and the server to adapt the application to the situation (adaptation to various client hardware capabilities or varying network conditions). Moreover, the present invention gives the ability to protect selective parts of the scene by sending them with pixel steaming. This is advantageous in a context of collaborative work. For instance, an application for collaborative authoring where on one hand the client receives the complete knowledge of some parts of the scene received as geometry: he can interact, edit, and send back these assets to the server. On the other hand the client will not have a complete knowledge of the parts received with pixel streaming. This allows to ensure the protection of original assets transmitted by pixel streaming as they are never transmitted directly. For instance, the user can only see a pixel view of a 3D modeled product and is not aware of the parts forming said product; the part forming an assembly of parts are thus preserved from any modification of the user, but also the knowledge of the assembly is limited to a given set of pixel forming a view. This advantageously provides an intellectual property protection.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the user may select a new viewpoint on a 3D scene that is rendered, and as a result the computing at least one new raster image of the first 3D modeled object is triggered according to the new viewpoint and streamed from the first computer to the second computer the at least one new raster image of the first 3D modeled object.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select: the field in many records to retrieve or create reports on particular aggregates of data according to the rules of the database management system being used. In the case of the method, the first computer comprises a database for storing at least a part of the assets of the 3D scene to be rendered on the second computer.

The method generally manipulates assets. Here, the term assets means 3D modeled objects, materials, textures, animations of the 3D models, lights, scene graphs, . . . and more generally the term asset includes all element that can be rendered or has an impact on the rendering of a 3D scene. For the sake of simplicity, the present invention will be now described in reference to modeled objects, being understood that the method of the invention is not limited to modeled object as such and that it can use any asset of a 3D scene. A modeled object is any object defined by data stored e.g. in the database. By extension, the expression "modeled object" designates the data itself. According to the type of the system, the modeled objects may be defined by different kinds of data. The system may indeed be a CAD system, a CAE system, a CAM system, a PDM system, a PLM system, a virtual world application, a video game; more generally the system may be any 3D applications performing the display of a 3D scene and its content—various assets that describe a partial or complete 3D virtual environment. In those different systems, modeled objects are defined by corresponding data. However, these systems are not exclusive one of the other, as a modeled object may be defined by data corresponding to any combination of these systems. A system may thus well be both a CAD and PLM system, as will be apparent from the definitions of such systems provided below.

The data defining a modeled object comprise data allowing the representation of the modeled object. The systems listed above may for example provide a representation of modeled objects using edges or lines, in certain cases with faces or surfaces. Lines, edges, or surfaces may be represented in various manners, e.g. non-uniform rational B-splines (NURBS). Specifically, a file contains specifications, from which geometry may be generated, which in turn allows for a representation to be generated. Specifications of a modeled object may be stored in a single file or multiple ones. The typical size of a file representing a modeled object, e.g. in a CAD system; is in the range of one Megabyte per part. And a modeled object may typically be an assembly of thousands of parts.

In practice, a modeled object may be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts, or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 7:
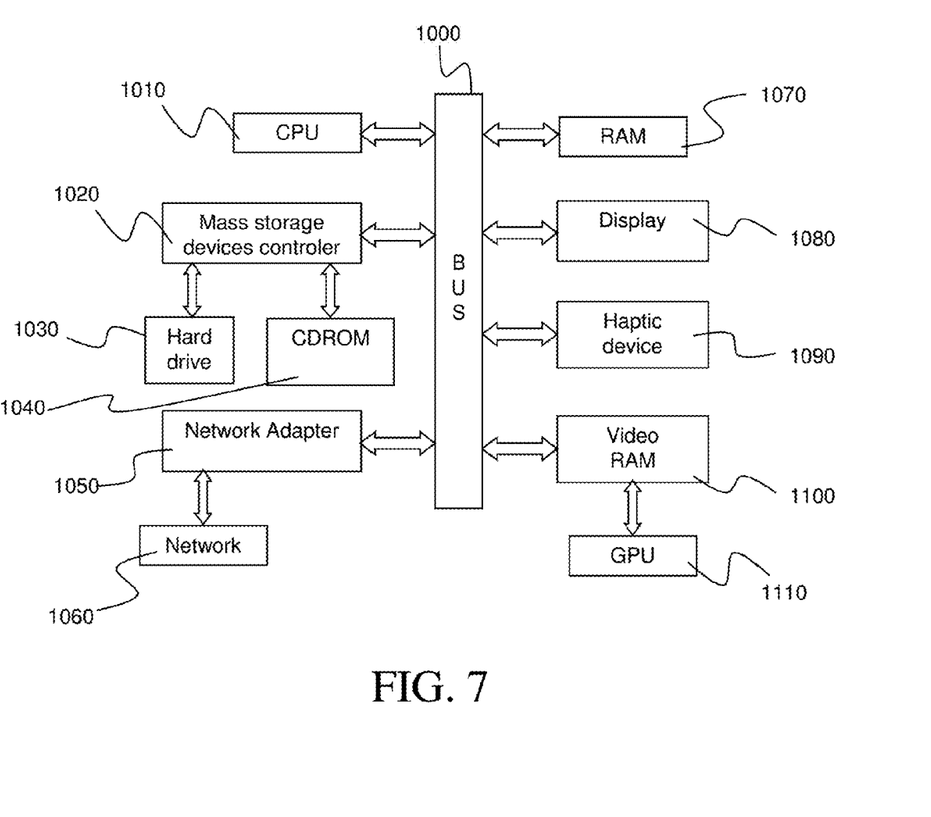
FIG. 7 shows an example of a server or a client of FIG. 5.

FIG. 7 shows an example of computer that is a client. This example can be applied for a server as well. The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be included in a manufacturing process, which may comprise, after performing the method, producing a physical product corresponding to the displayed modeled object.

Referring back to FIG. 1, it is now discussed an example of method for displaying a 3D assembly of modeled objects.

At step S10, an application that runs on the computer of a user requests the display of the 3D assembly, e.g. upon user action that selects an assembly to be displayed. The computer of the user is also referred to as a client or second computer, in contrast to the server (also referred to as first computer) that stores at least some of the modeled objects of the 3D assembly to be displayed.

Figure 5:
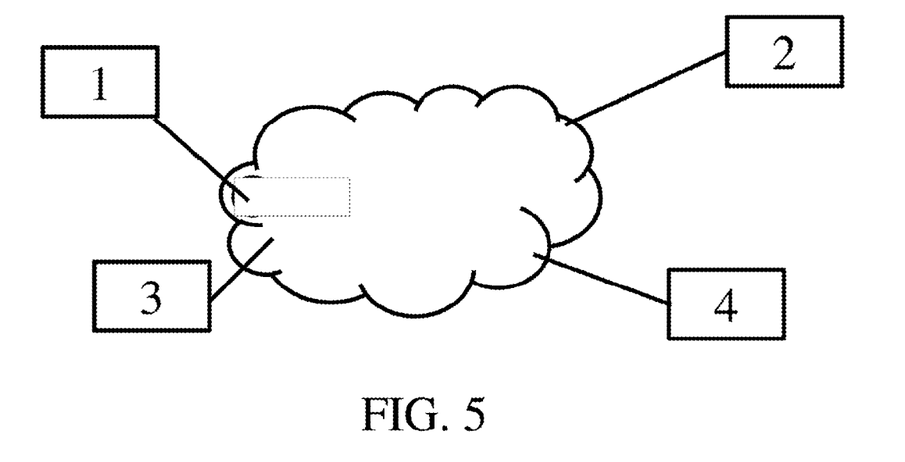
FIG. 5 shows an example of clients and servers interconnected through a communication network.

Referring now to FIG. 5, it is shown an example of a server 1 and a client 2 that are connected together, e.g. through a computer network. The computer network is a telecommunications network which allows computers to exchange data. It may be, but is not limited to, a LAN, MAN, WAN, the Internet, . . . . The method of the present invention can be performed for any kind of computer network. Still in reference to FIG. 5, a second client 4 is represented that may request the display of the same 3D assembly stored on the server 1, or request the display of another 3D assembly that might be stored on the server 1 or on a second server 3. Interestingly, the modeled object(s) of the 3D assembly that are not stored on the server 1 can be stored on the other server 3, or on the client 2 that performed the request, or even on the second client 4. Hence, the present invention can be performed in a client/server model or a peer to peer model; in fact, any computer 1, 2, 3 reachable by the client 2 requesting the display of the 3D assembly can store modeled objects of the assembly to display.

Back to FIG. 1, at step S12, at least one raster image of a first 3D modeled object is computed by the server. The term raster image designates a dot matrix data structure representing a generally rectangular grid of pixels, or points of color, viewable via a computer. A raster image is technically characterized by the width and height of the image in pixels and by the number of bits per pixel. The term first 3D modeled object means the one or more modeled objects forming the 3D assembly that are stored on the server. The server performs the computation as known in the art. For instance, the server receives the request of the application (S10), retrieves from its database the 3D objects forming the assembly, computes from the retrieved 3D objects the pixels of these 3D objects in the 3D space, then a viewpoint is selected (for instance by default, or the last viewpoint of a user of said assembly), and the raster image is obtained according to the selected viewpoint. In practice, a 3D rendering engine produces the one or more raster images of the 3D scene viewed from a particular viewpoint, as known in the art; e.g. the 3D rendering engine uses the Computing Processing Unit (CPU) of the server for computing the pixels of these 3D objects in the 3D space, and uses a Graphical Processing Unit of the server for obtaining an image (a set of pixel) according to a viewpoint on the 3D space. In practice, the most common pipeline is the following. The CPU sends to the GPU a list of triangles. Then the GPU transforms the coordinates of the vertices of the triangles in a reference fame into new coordinates in the frame of the current viewpoint. The new coordinates of the triangles are then projected in a 2D space and the projected triangles are transformed into a set of pixels forming an image to be displayed.

At step S14, a depth buffer is computed for each raster image of the first 3D modeled object obtained at step S12. The term depth buffer means the result of a depth buffering (also known as z-buffering) process. Depth buffering or z-buffering is well known in the art. The depth buffer of each image stores for each pixel of the image the depth of the pixel (z coordinate). The depth buffer is a 2D array (x-y) with the same dimension as that the raster image which for each pixel in the raster image stores a value related to the distance from this pixel to the camera. Interestingly, the stored value in the depth buffer may be not always a linear function of the distance point-camera, however it is always a monotone function (most of the time a strictly increasing function), as known in the art. Any granularity of the depth buffer can be used, e.g. a 16-bit or 24-bit or 32-bit depth buffer. In practice, the higher available granularity is selected; in general a 32-bit depth buffer.

The steps S12 and S14 are performed by the first computer. This implies graphic rendering capabilities on the first computer. The steps S12 and S14 are performed consecutively for each new raster image that is computed. This means that if several raster images are computed successively, the depth buffer of a raster image is immediately computed after that the one raster image has been computed. Alternatively, a set of depth buffers can be computed after that the raster images (for instance a predetermined number of raster images) have been computed.

Then, at step S20, the raster image(s) computed at step S12 is streamed from the server to the client; hence, the client receives a stream of pixel images. Streaming means the raster images are received by and presented to the client while being delivered by the server. A channel is created an opened between the client and the server, e.g. the channel is created upon request of the client. And the server sends to the client the raster image(s) through this channel.

The raster images and the depth buffers may be streamed together. This means that the client receives "at the same time" the raster image and the depth buffer associated with it. There, the expression "at the same time" means in a given time slot that may vary depending on the computer network parameters (bandwidth, protocols, . . . ) and states (congestion, lags, . . . ). For instance, in a five seconds time slot, the client receives the raster image and then the depth buffer. As already discussed, the steps S12 and S14 are performed consecutively for each new raster image that is computed, which therefore makes it easier the streaming of the depth buffer with the raster image.

The raster images and the depth buffers may be streamed in a single stream, that is, with one stream. Alternatively, the raster images are streamed in a first single stream, and the depth buffers are streamed in a second single stream.

In practice, the single stream that includes the raster images and/or the single stream that includes the depth buffers, or the single stream that includes both the raster images and the depth buffers is(are) encoded. The encoding may be a compression scheme. For instance, it is possible to use standard video compression scheme such as H.264 as the sequence of rendered images or the sequence of depth buffer makes videos. Interestingly, the H.264 compression scheme can be enhanced with methods such as those described in the documents "Real-time 3D Graphics Using Streaming MPEG-4" by L. Cheng & al. or "Accelerated Video Encoding Using Context Information Render" by P. Fechteler and P. Eisert, which provide a way to compute motions vectors directly from 3D scene information used during the rendering of the scene (depth, camera movement or 3D parts movements) instead of using computationally expensive motion estimation search algorithm found in standard video codec. The documents "Scalable Remote Rendering with Depth and Motion-flow Augmented Streaming" by D. Pajak, R. Herzog et al provides a solution to encode both the rendered image and the depth buffer in a single video stream by taking into account that they are highly correlated. Advantageously, this last solution allows to produce a single stream which includes both the rendered image and the depth buffer, and which can be lighter than the rendered image encoded alone in a H.264 stream depending on the 3D scene.

It is to be understood that any data (raster images, depth buffers . . . ) that needs to be sent from the server to the client (an even from the client to the server) is preferably sent with the streaming channel. For instance, when the 3D scene is modified on the server (e.g. a new object in the 3D scene, a simulation on the 3D scene is executed), the modifications are streamed to the client. In practice, the user on the client interacts with the 3D scene so that data are constantly received by and presented to the client. And when the user does not interact with the 3D scene (or when nothing is in motion in the 3D scene), the quantity of data streamed is very low; being understood that the channel is maintained open.

Then, at step S30, a second 3D modeled object is merged with the streamed at least one raster image. The second 3D modeled object is a geometric 3D modeled object, and the client computer performs the merge. Merging means that the data defining the second 3D modeled object are rendered "into" the rendered view sent by pixel streaming. As discussed previously above, these data comprise the data allowing the representation of the modeled object, e.g. a representation using edges or lines, in certain cases with faces or surfaces. Therefore, the step S30 implies this time graphics rendering capabilities on the second computer: an image of the second 3D modeled object is computed by the client and this image is combined with the one or more raster images. Hence, the newly computed image of the second 3D modeled object and the streamed raster image are united for forming an image to be rendered on the second (client) computer. The second 3D modeled object may be stored on the client computer, or it can be sent from a third computer to the client computer. For instance, and in reference to FIG. 5, the second 3D modeled object can be stored on the other server 3, or on the client 2 that performed the request, or even on the second client 4.

The result of the merging is a new image to be rendered. The merging thus comprises rendering the geometries of the second 3D modeled object "into" the rendered view sent by pixel streaming. The image of the second 3D modeled object is combined by the second computer with the current raster image received from the streaming of raster images. In practice, the image of the second 3D modeled object has the same size (same pixel length, pixel width, and number of pixels) as the raster image.

When merging the second 3D modeled object with the raster image, a viewpoint on the second 3D modeled object is selected for computing the image of the second modeled object. The selection of the viewpoint may be performed by default (e.g. the last viewpoint of a user of the second object), by a random process, with the same viewpoint as the one selected for the raster image (e.g. position of the camera is provided in a frame of reference shared by the first and second modeled objects).

The combination of the raster image and computed image of the second 3D modeled object may be carried out by performing a pixel-by-pixel comparison to determine which fragments of the second 3D modeled object is rendered. The term fragment means a part of a 3D object which might produce a pixel (drawn or not) on the rendered image. This term is a widely used and known in the art. Each time a fragment of the second 3D modeled object should be drawn on a pixel of the rendered image of the 3D assembly of modeled objects, a comparison is made between the corresponding value in the depth buffer streamed from the first computer and the value related to the distance of F to the camera. As stated previously, values stored in the streamed depth buffer are related to the distance from the camera to the corresponding pixel in the streamed rendered image. So this pixel-by-pixel comparison is made to determinate if the fragments of the second 3D modeled object that should be drawn are further or closer to the camera than the already drawn pixels coming from the streamed at least one raster image of the first 3D modeled object. This method is referred as z-culling and allows to display on the second computer a view of the 3D assembly by rendering the geometries of the second 3D modeled object "into" the rendered view sent by pixel streaming. The depth buffer (or depth map) sent in the "pixel stream" is thus used to solve occlusions i.e. determine which elements each stream are visible or not in the view of the 3D assembly.

Next, at step S40, lighting effects on the view of the 3D assembly (S30) are computed to further improve the quality of the rendered image of the 3D assembly. The term lighting effects comprises notably lights and shadows of the first 3D modeled object on the visual aspect of the second 3D modeled object, and vice versa. Thus, lighting interactions (cast lights and shadows) between the first 3D modeled objects of the pixel stream and the second 3D modeled object of the geometrical stream are computed.

Then, at step S50, the 3D assembly of modeled objects is rendered and displayed on the second computer. This is performed as known in the art.

Figure 3:
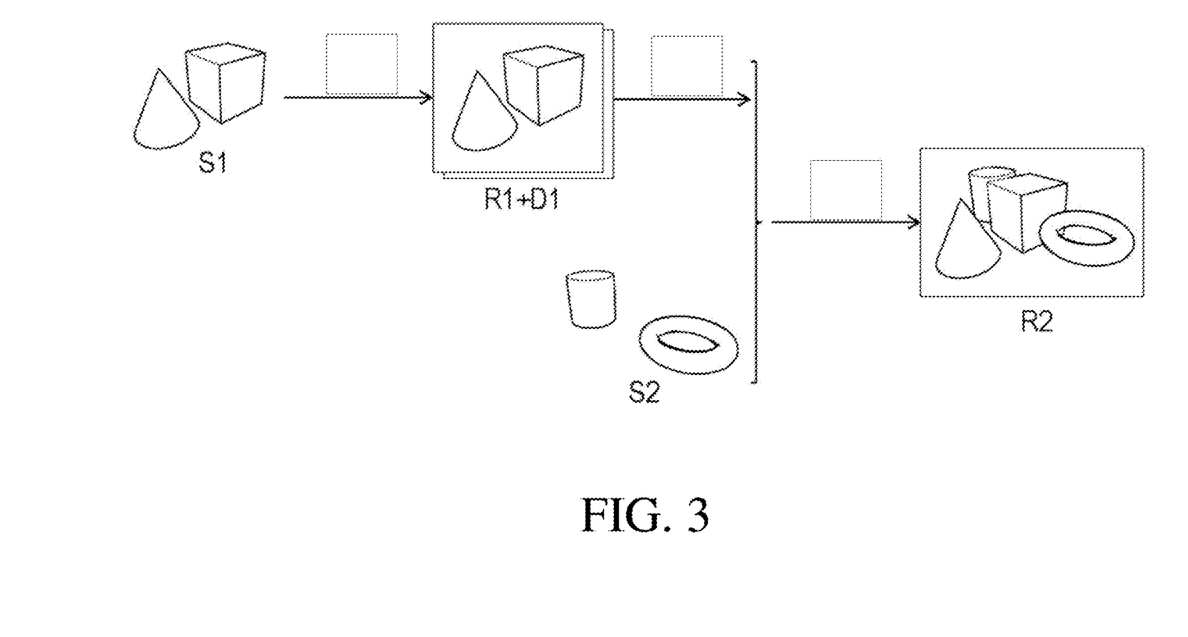
FIG. 3 illustrates the example of FIG. 1.

Referring now to FIG. 3, it is discussed an example of the invention as described in reference to the flowchart of FIG. 1. The user has requested (S10) the display on a computer client of a 3D assembly that comprises two 3D modeled objects (a cube and a cone) of a first set S1 stored on a first server and two 3D modeled objects (a cylinder and a torus) of a second set S2 stored on a second server. As a result of the request, a raster image R1 and a depth map D1 (or depth buffer) of S1 are computer (S12, S14) by the first server, and then a single pixel streaming comprising R1 and D1 is sent to the client by the first server, and a geometrical streaming of the second set S2 is sent to the client by the second server. Other configurations might be contemplated; for instance, the first server might send two pixel streams (one for the R1 and one for D1), and/or the set S2 might be stored on the client computer. The client then merges the two streams, computes the light effects, and remotely renders the 3D assembly R2.

The present invention improves scalability of remote rendering in the situation the number of clients increases. For instance, it is possible to increase the number 3D objects of the 3D scene that are the part streamed as pixel to the part streamed as geometries, it may be beneficial to do so when the number of clients increases. Hence, the present invention allows to perform a load balancing between pixel and geometry streaming depending on the number of clients and their configuration. As another example, if two or more clients viewpoints are close enough, a viable strategy is to send assets close to them with geometry streaming (in a mutual stream via multicast if possible) and send distant objects with pixel streaming; indeed, streamed images have a chance to be close enough with only small shifts in the position of some assets due to the parallax, which means these images may also be sent in a mutual stream via multicast. Another "load balancing" strategy is to use geometry streaming with objects the client is more likely to interact with, and send distant objects with pixel streaming. Advantageously, in case of network break, the client will still be able to interact with objects he was more likely to.

The client will also be able to change its viewpoint as the distortion of the part sent with pixel streaming remains acceptable (in regards with deformations due to parallax).

Figure 2:
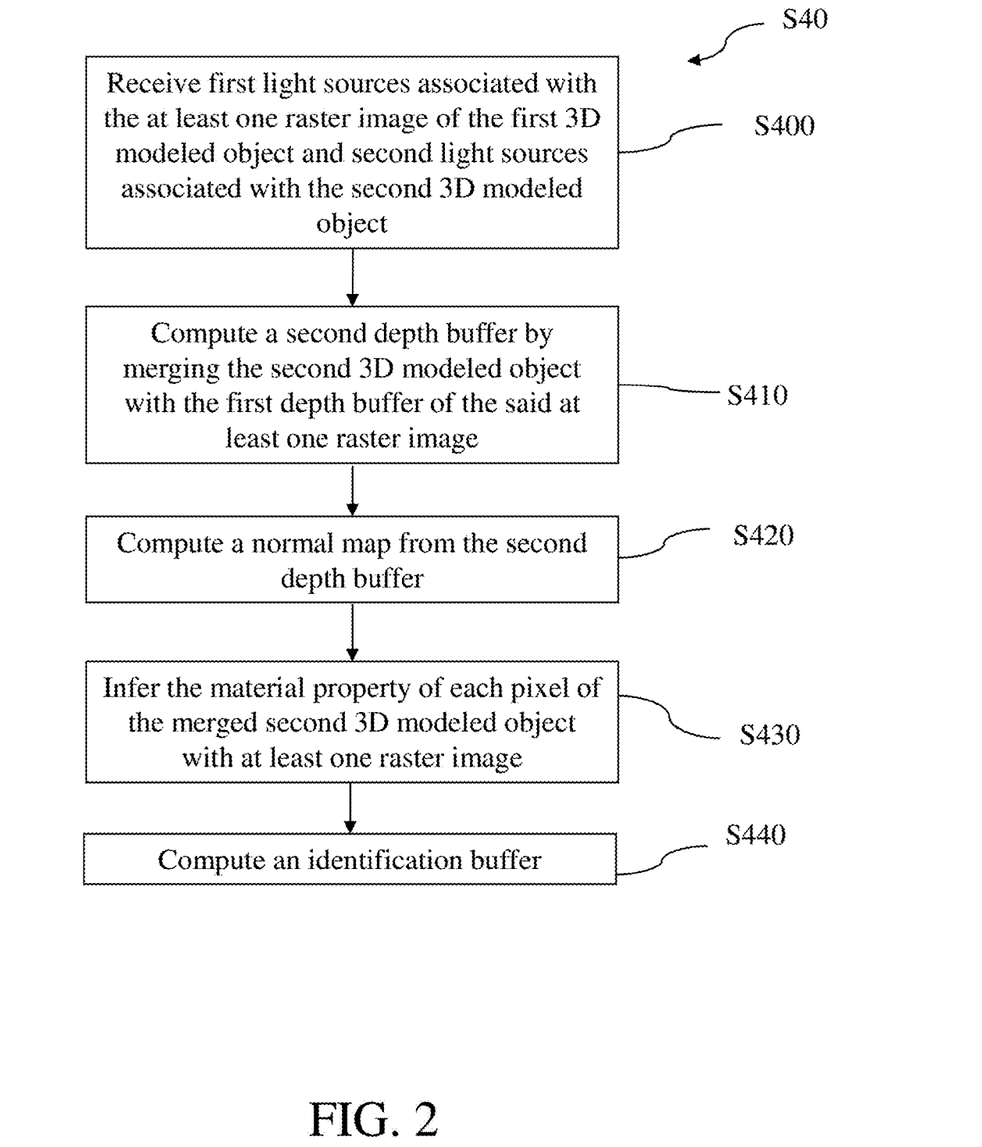
FIG. 2 shows a flowchart of an example for computing lighting effects.

Referring now to FIG. 2, an example of computation (S40) of lighting effects on the 3D assembly of modeled objects is now discussed. Many techniques have been developed in the field of 3D computer graphics to compute these lighting effects as post-processing. Here post processing means that the lighting effects are computed after conversion to the RGB space of the pixels, e.g. the image of the 3D assembly is stored in a frame buffer and post processed from there. This includes techniques referred as deferred shading, screen space ambient occlusion, screen space direct occlusion, screen space local reflections, screen space shadow ray tracing . . . . These techniques share that they require at least the following pieces of information for each pixel: surface normal direction and material properties. They also might require information about light sources (position, color, range . . . ).

At step S400, the server receives one or more first light sources information associated with the at least one raster image of the first 3D modeled object and one or more second light sources information associated with the second 3D modeled object. In practice, the first light source(s) information is transmitted within the same stream as the one transporting the raster image. Alternatively, it can be sent with the stream of the depth buffer, or it can be sent in its own single stream. The second light source(s) information is transmitted within the geometrical stream; being understood that it can also be sent in its own single stream. The information for each light source comprises at least the position of the light source (e.g. in a frame of reference shared by the first and second modeled objects). It may further comprises, but is not limited to, the color of the light source, the spectral distribution, the spatial distribution of the luminous intensity.

Next, at step S410, a second depth buffer is computed by merging the second 3D modeled object with a first depth buffer of the said at least one raster image. This merge is performed the same way as for the merge of the second 3D modeled object with the raster image.

Then, at step S420, a normal map is computed from the second depth buffer (S410). The normal map stores for each pixel of the 3D assembly of modeled objects a surface normal direction. The normal map can be computed by applying a convolution filter to the second depth buffer. The computation is of the normal map may be performed as known in the art. A gradient of the depth (convolution using Sobel Mask as filter) is computed; this gradient is a rough approximation of the normals in the screen space. Then, this gradient can be "un-projected" from the 2D space (the screen-space) to the reference space.

Then, at step S430, the material property of each pixel of the merged second 3D modeled object with at least one raster image is inferred. This may be performed by, e.g. from pixel colors or streamed. Alternatively, the material property can be directly obtained from the server hosting the first and second 3D modeled object, e.g. it is sent with the light sources information in the same stream.

Next, at step S440, an identification buffer is computed. From the first set of 3D modeled objects only a rendered image and a depth buffer are known by the client. As stated above, the lighting techniques may require for each pixel a depth, a surface normal direction, few material properties. So an additional step is required to recover this missing information. This additional buffer (the identification buffer) is used to store for each pixel a binary value which identify if the drawn pixel comes from the streamed image of the first scene or from the rendering of 3D parts of the second set. From now, the origin of each pixel (from which set of 3D objects—the first 3D modeled object or the second 3D modeled object) do they come from) so that the lighting of a pixel only take into account information coming from pixels of the other set and light sources associated with the other set.

It is to be understood that the flowchart of FIG. 2 is only an example and that the order of the steps may be modified without altering the computing of lighting effects. Another example is provided in relation with FIG. 4.

Figure 4:
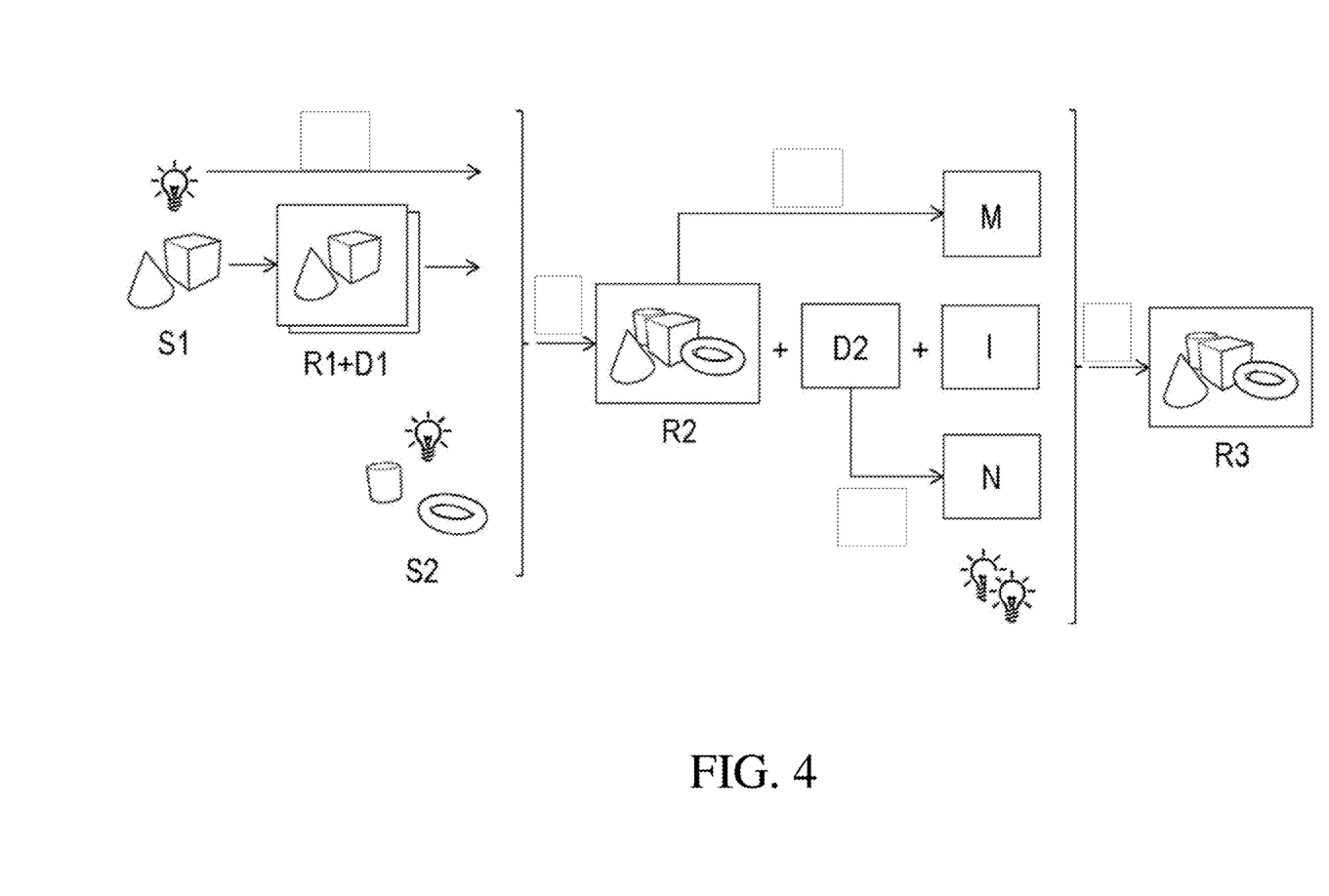
FIG. 4 illustrates the example of FIG. 2.

The client computer has now all the information for computing lighting effects as post processing starting from surface normal direction and material property of each pixel. Referring to FIG. 4, it is discussed an example of the invention as described in reference to the flowcharts of FIGS. 1 and 2. FIG. 4 is a modified pipeline of the one of FIG. 3 to include lighting correction with post-processing techniques; steps of FIG. 3 previously discussed are still valid. The user has requested (S10) the display on a computer client of a 3D assembly that comprises two 3D modeled objects (a cube and a cone) of a first set S1 stored on a first server and two 3D modeled object (a cylinder and a torus) of a second set S2 stored on a second server. As a result of the request, a raster image R1 and a first depth map D1 (or depth buffer) of S1 are computer (S12, S14) by the server, information of a first light source L1 (symbolized by a bulb) are identified in the 3D scene from which R1 has been computed, and R1, D1 and L1 are streamed from the first server to the server. Concomitantly, a geometrical streaming of the second set S2 together with information of a second light source L2 (symbolized also by a bulb) associated with S2 are sent to the client by the second server. The client then merges the two streams, that is, the client merges the raster image R1 with the geometric set S2. The 3D assembly R2 is obtained as a result of the merge. Then, material properties of the objects of R2 are inferred (S430). The inference of the material properties M of the pixels of R2 is performed, e.g. upon identification of material properties sent within the pixel and geometry streams or upon analysis of the color of the pixels of R2. While computing material properties, a second depth buffer D2 is computed (S410) by merging of the second set S2 with D1, and an identification buffer I is then computed (S430). A normal map N is produced from D2 (S420). Now, the client comprises the data for performing lighting correction with post-processing techniques which require as input R2, D2, I, N, M and light sources information from S1 and S2. A new image R3 is pro R2 where the lighting influence of the objects and light sources from S1 on the objects of S2 (and vice versa) is taken into account. The 3D assembly of modeled objects R3 is rendered and displayed to the user.

Figure 6:
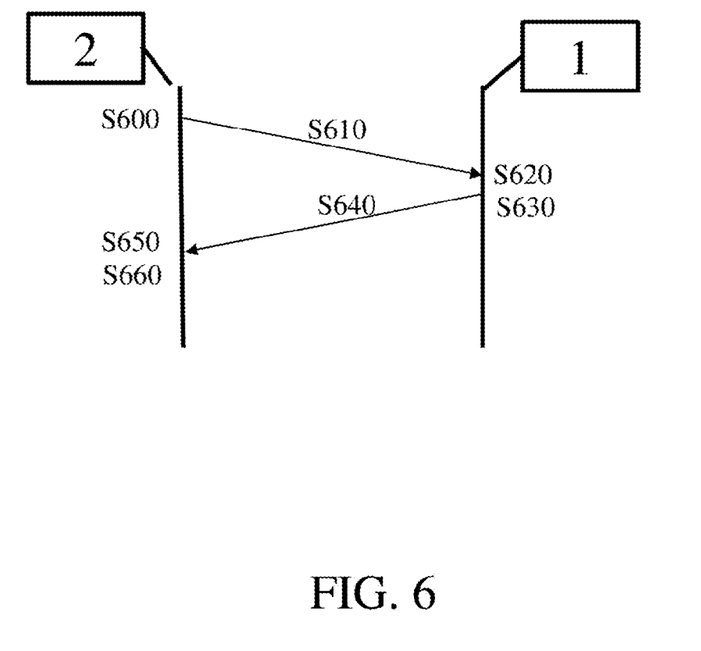
FIG. 6 shows an example of interaction between a client and a server when the client modifies the viewpoint on the 3D scene.

Referring now to FIG. 6, it is discussed the interactions (or communication exchanges) between a server and a client when the user on the client changes the viewpoint on the rendered 3D assembly (e.g. R2 in FIG. 3 or R3 in FIG. 4). The client and the server can be the client 2 and the server 1 as represented on FIG. 5. 15. A client and the server are connected with a least with streaming channel. The client and the server second computers comprise a processing circuitry coupled to a memory. The client further comprises a graphical user interface that allows the user acting on the 3D scene. Each memory of the first and second computer has recorded thereon a computer program for performing the exchanges S600 to S660 represented on FIG. 6. This means that the computer program on the memory of the server and the computer program on the memory of the client allows performing the method of the invention. The computer program on the memory of both the client and the server can be the same.

Alternatively, the computer program on the memory of the server allows creating and/or maintaining the channel for streaming data, and it further allows performing the steps S620 to S640; the computer program on the memory of the client allows creating and/or maintaining the channel for streaming data, and it further allows performing the steps S600 to S610 and 650 to 660. In this alternative, the computer program on the client and on the server are not identical, but cooperate for performing the method of the invention.

At step S600, a new viewpoint on the displayed 3D assembly is selected by the user on the client computer. This is performed as known in the art. A message S610 is sent to the server with the coordinates of the new selected viewpoint on the 3D assembly. The server receives the message S620 and the new coordinates contained therein. It is a straightforward operation for the server to apply the new coordinates as the 3D scene on the server comprising the first 3D modeled object and the raster image merged with the second 3D modeled object share a same frame of reference; for instance, the Graphical Processing Unit of the server can obtain the new set of pixels to be displayed by applying directly the new viewpoint on the 3D scene. The server computes the new raster image of the first 3D modeled object according to the new viewpoint (S630), which is streamed (S640) from the server to the client; and finally received (S650) by the client. The client merges the second 3D modeled object with the streamed new raster image, and render (S660) a new view of the 3D assembly. The steps S630-S660 are performed as discussed in reference to FIGS. 1-4.

Interestingly, steps of FIG. 6 apply only when the user changes the viewpoint of the 3D modeled objects of the first set. Indeed, when the user manipulates (e.g. move, rotate, . . . ) a modeled object of the second set, no request has to be performed on the server from which the second modeled object(s) were streamed as the client computer has all the data for computing a new image of the second modeled object(s)—for instance according to a new viewpoint.

While this invention has been particularly shown and described with references to example embodiments thereof, it will be understood by those skilled in the art that various changes in form and details may be made therein without departing from the scope of the invention encompassed by the appended claims.

The invention claimed is:

1. A computer-implemented method for displaying a 3D assembly of modeled objects, comprising:
streaming from a first computer communicatively coupled to a second computer at least one raster image of a first 3D modeled object and a first depth buffer of the at least one raster image;
merging a second 3D modeled object with the streamed at least one raster image, the merging comprising performing a pixel-by-pixel comparison to determine, based on the first depth buffer, which fragment of the second 3D modeled object is rendered;
receiving, on the second computer, first light sources associated with the at least one raster image of the first 3D modeled object and second light sources associated with the second 3D modeled object;
computing a normal map that stores, for each pixel of the 3D assembly of modeled objects, a surface normal direction;
computing lighting effects on the 3D assembly of modeled objects as post processing starting from a surface normal direction and a material property of each pixel; and
rendering, on the second computer, the 3D assembly of modeled objects, wherein
the normal map is computed from a second depth buffer obtained by merging the second 3D modeled object with a first depth buffer of the at least one raster image.

2. The computer-implemented method of claim 1, wherein streaming from the first computer to the second computer comprises simultaneously streaming from the first computer to the second computer the at least one raster image of the first 3D modeled object together with the first depth buffer of the at least one raster image.

3. The computer-implemented method of claim 2, further comprising, before the streaming:
encoding both the at least one raster image of the first 3D modeled object and the first depth buffer in a single stream.

4. The computer-implemented method of claim 3, wherein the encoding is performed by using a video compression scheme.

5. The computer-implemented method of claim 1, further comprising, after receiving the first and second light sources and before computing the lighting effects:
computing an identification buffer that identifies, for each pixel of the 3D assembly of modeled objects, whether a pixel comes from the streamed at least one raster image of the first 3D modeled object or from the second 3D modeled object merged with the streamed at least one raster image.

6. The computer-implemented method of claim 1, wherein computing the normal map from the second depth buffer comprises applying a convolution filter to the second depth buffer.

7. The computer-implemented method of claim 1, wherein the material property of each pixel is inferred from the color of each pixel of the merged second 3D modeled object with at least one raster image.

8. The computer-implemented method of claim 1, further comprising:
sending from the second computer to the first computer coordinates of a new viewpoint on the 3D assembly of modeled objects rendered on the second computer;
computing at least one new raster image of the first 3D modeled object according to the new viewpoint; and
streaming from the first computer to the second computer the at least one new raster image of the first 3D modeled object.

9. The computer-implemented method of claim 1, wherein the second 3D modeled merged with the streamed at least one raster image is sent from a third computer to the second computer.

10. A computer program stored on a non-transitory computer readable medium comprising instructions for performing the method of claim 1.

11. The computer-implemented method of claim 1, further comprising:
sending from the second computer to the first computer coordinates of a new viewpoint on the 3D assembly of modeled objects rendered on the second computer;

computing at least one new raster image of the first 3D modeled object according to the new viewpoint; and streaming from the first computer to the second computer the at least one new raster image of the first 3D modeled object, wherein the second 3D modeled merged with the streamed at least one raster image is sent from a third computer to the second computer.

12. A non-transitory computer readable medium having recorded thereon a computer program that when executed by a computer causes the computer to implement a computer-implemented method for displaying a 3D assembly of modeled objects, the method comprising:

receiving from a first computer communicatively coupled to a second computer at least one raster image of a first 3D modeled object and a first depth buffer of the at least one raster image;

merging a second 3D modeled object with the received at least one raster image, the merging comprising performing a pixel-by-pixel comparison to determine, based on the first depth buffer, which fragment of the second 3D modeled object is rendered;

receiving first light sources associated with the at least one raster image of the first 3D modeled object and second light sources associated with the second 3D modeled object;

computing a normal map that stores, for each pixel of the 3D assembly of modeled objects, a surface normal direction;

computing lighting effects on the 3D assembly of modeled objects as post processing starting from a surface normal direction and a material property of each pixel; and rendering the 3D assembly of modeled objects, wherein the normal map is computed from a second depth buffer obtained by merging the second 3D modeled object with a first depth buffer of the at least one raster image.

13. A system comprising:

a first computer; and a second computer, wherein the first computer and the second computer are connected with a streaming channel, wherein the first and second computers comprise processing circuitry coupled to a memory, wherein the second computer further comprises a graphical user interface, wherein each memory of the first and second computer has recorded thereon a computer program for performing displaying of a 3D assembly of modeled objects, and wherein the processing circuitry is configured by computer programs to stream from the first computer to the second computer at least one raster image of a first 3D modeled object and a first depth buffer of the at least one raster image, merge a second 3D modeled object with the streamed at least one raster image, the merging comprising performing a pixel-by-pixel comparison to determine, based on the first depth buffer, which fragment of the second 3D modeled object is rendered, receive, on the second computer, first light sources associated with the at least one raster image of the first 3D modeled object and second light sources associated with the second 3D modeled object, compute a normal map that stores, for each pixel of the 3D assembly of modeled objects, a surface normal direction, compute lighting effects on the 3D assembly of modeled objects as post processing starting from a surface normal direction and a material property of each pixel, and render, on the second computer, the 3D assembly of modeled objects, wherein the normal map is computed from a second depth buffer obtained by merging the second 3D modeled object with a first depth buffer of the at least one raster image.

* * * * *